United States Patent
Reeves et al.

(10) Patent No.: US 11,297,662 B1
(45) Date of Patent: Apr. 5, 2022

(54) SYSTEMS AND METHODS FOR CONNECTING A DEVICE TO A WIRELESS TELECOMMUNICATIONS NETWORK

(71) Applicant: T-MOBILE INNOVATIONS LLC, Overland Park, KS (US)

(72) Inventors: Raymond Reeves, Oviedo, FL (US); Simon Youngs, Overland Park, KS (US); Mark Peden, Paola, KS (US)

(73) Assignee: T-Mobile Innovations LLC, Overland Park, KS (US)

( * ) Notice: Subject to any disclaimer, the term of this patent is extended or adjusted under 35 U.S.C. 154(b) by 11 days.

(21) Appl. No.: 16/895,462

(22) Filed: Jun. 8, 2020

(51) Int. Cl.
*H04W 24/10* (2009.01)
*H04W 76/10* (2018.01)
*H04W 72/04* (2009.01)
*H04B 17/318* (2015.01)

(52) U.S. Cl.
CPC .......... *H04W 76/10* (2018.02); *H04B 17/318* (2015.01); *H04W 24/10* (2013.01); *H04W 72/046* (2013.01)

(58) Field of Classification Search
CPC ... H04W 76/10; H04W 24/10; H04W 72/046; H04B 17/318
See application file for complete search history.

(56) References Cited

U.S. PATENT DOCUMENTS

2019/0373450 A1* 12/2019 Zhou .................... H04W 48/12
2021/0075527 A1* 3/2021 Vieira .................. H04B 17/364

* cited by examiner

Primary Examiner — Chuong A Ngo

(57) ABSTRACT

Methods and systems for connecting a device to a wireless telecommunications network. The methods can include receiving an inquiry from a device for connecting to an antenna array. The methods can also include determining if the inquiry satisfies one or more predetermined connection rules.

18 Claims, 6 Drawing Sheets

SYSTEMS AND METHODS FOR CONNECTING A DEVICE TO A WIRELESS TELECOMMUNICATIONS NETWORK

SUMMARY

The present disclosure is directed, in part, to systems and methods for connecting a device to a wireless telecommunications network, substantially as shown in and/or described in connection with at least one of the figures, and as set forth more completely in the claims.

In aspects set forth herein, an inquiry, provided by a device, for connecting to an antenna array is analyzed to determine if the inquiry satisfies one or more predetermined connection rules. In aspects, the inquiry can include an identification of one or more beam indices for connecting to the antenna array. Depending upon whether or not the inquiry satisfies the one or more predetermined connection rules, the device may connect to the antenna array via a beam index that may or may not have been identified by the device as the one or more beam indices of the initial inquiry.

This summary is provided to introduce a selection of concepts in a simplified form that are further described below in the detailed description. This summary is not intended to identify key features or essential features of the claimed subject matter, nor is it intended to be used in isolation as an aid in determining the scope of the claimed subject matter.

BRIEF DESCRIPTION OF THE SEVERAL VIEWS OF THE DRAWINGS

Implementations of the present disclosure are described in detail below with reference to the attached drawing figures, wherein.

DETAILED DESCRIPTION

Figure 1:
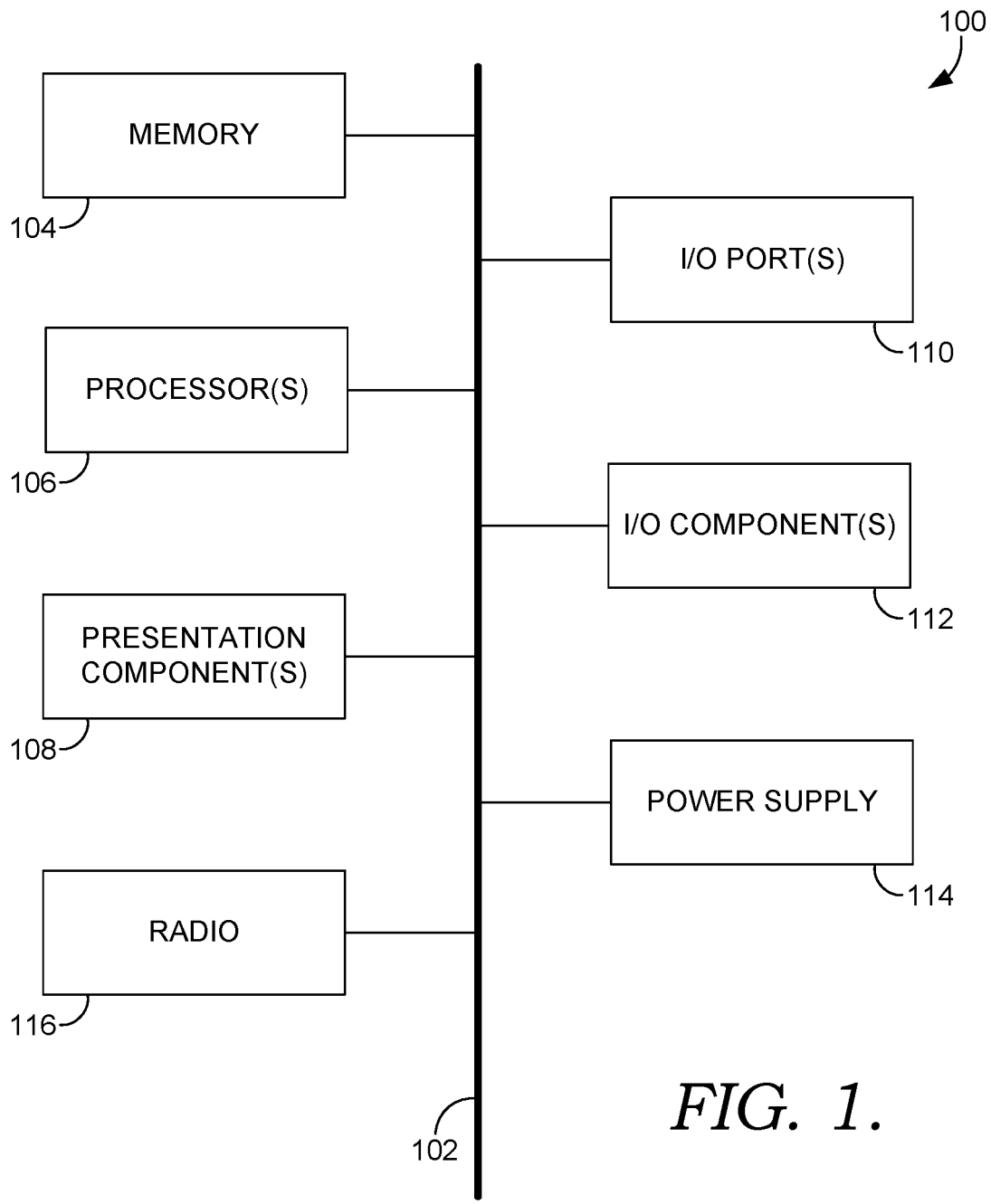
FIG. 1 depicts a diagram of an exemplary computing environment suitable for use in implementations of the present disclosure.

The subject matter of embodiments of the invention is described with specificity herein to meet statutory requirements. However, the description itself is not intended to limit the scope of this patent. Rather, the inventors have contemplated that the claimed subject matter might be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

Throughout this disclosure, several acronyms and shorthand notations are employed to aid the understanding of certain concepts pertaining to the associated system and services. These acronyms and shorthand notations are intended to help provide an easy methodology of communicating the ideas expressed herein and are not meant to limit the scope of embodiments described in the present disclosure. The following is a list of these acronyms:

3G Third-Generation Wireless Technology
4G Fourth-Generation Cellular Communication System
5G Fifth-Generation Cellular Communication System
CD-ROM Compact Disk Read Only Memory
CDMA Code Division Multiple Access
eNodeB Evolved Node B
gNodeB Next Generation Node B
GIS Geographic/Geographical/Geospatial Information System
GPRS General Packet Radio Service
GSM Global System for Mobile communications
iDEN Integrated Digital Enhanced Network
DVD Digital Versatile Discs
EEPROM Electrically Erasable Programmable Read Only Memory
LED Light Emitting Diode
LTE Long Term Evolution
MD Mobile Device
NR New Radio
PC Personal Computer
PCS Personal Communications Service
PDA Personal Digital Assistant
RAM Random Access Memory
RET Remote Electrical Tilt
RF Radio-Frequency
RFI Radio-Frequency Interference
R/N Relay Node
RNR Reverse Noise Rise
ROM Read Only Memory
RSRP Reference Transmission Receive Power
RSRQ Reference Transmission Receive Quality
RSSI Received Transmission Strength Indicator
SINR Transmission-to-Interference-Plus-Noise Ratio
SNR Transmission-to-noise ratio
SON Self-Organizing Networks
TDMA Time Division Multiple Access
UMTS Universal Mobile Telecommunications Systems Further, various technical terms are used throughout this description. An illustrative resource that fleshes out various aspects of these terms can be found in Newton's Telecom Dictionary, $31^{st}$ Edition (2018).

Embodiments of the technology described herein may be embodied as, among other things, a method, system, or computer-program product. Accordingly, the embodiments may take the form of a hardware embodiment, or an embodiment combining software and hardware. An embodiment takes the form of a computer-program product that includes computer-useable instructions embodied on one or more computer-readable media.

Computer-readable media include both volatile and nonvolatile media, removable and nonremovable media, and contemplate media readable by a database, a switch, and various other network devices. Network switches, routers, and related components are conventional in nature, as are means of communicating with the same. By way of example, and not limitation, computer-readable media comprise computer-storage media and communications media.

Computer-storage media, or machine-readable media, include media implemented in any method or technology for storing information. Examples of stored information include computer-useable instructions, data structures, program modules, and other data representations. Computer-storage media include, but are not limited to RAM, ROM, EEPROM, flash memory or other memory technology, CD-ROM, digital versatile discs (DVD), holographic media or other optical disc storage, magnetic cassettes, magnetic tape, magnetic disk storage, and other magnetic storage devices. These memory components can store data momentarily, temporarily, or permanently.

Communications media typically store computer-useable instructions—including data structures and program modules—in a modulated data signal. The term "modulated data signal" refers to a propagated signal that has one or more of its characteristics set or changed to encode information in the signal. Communications media include any information-delivery media. By way of example but not limitation, communications media include wired media, such as a wired network or direct-wired connection, and wireless media such as acoustic, infrared, radio, microwave, spread-spectrum, and other wireless media technologies. Combinations of the above are included within the scope of computer-readable media.

By way of background, in certain conventional systems, a device may detect one or more synchronization signals or other signals from a cell site or an associated network antenna array to attempt to gain initial access to the cell site for communication with a network. In some conventional systems, the device may communicate with the cell site and request or indicate that the device prefers to connect with the cell site on a specific beam index. In such conventional systems, the cell site or network initiates access and communication with the device over the specific beam index indicated as preferred by the device. However, in certain scenarios, it may be desirable for strategically assigning beam indices to various devices for initial access and/or for communication with the network.

The systems and methods provided herein can alleviate one or more of the problems discussed above. For instance, in aspects, the systems disclosed herein can receive an inquiry provided by a device for connecting to an antenna array, and can determine if the inquiry satisfies one or more predetermined connection rules prior to assigning and/or connecting the antenna array to the device. In various aspects, the inquiry from the device may include an identification of a preferred beam index for connecting to the antenna array. In such aspects, if the inquiry from the device does not satisfy one or more predetermined connection rules, the inquiry is modified so that a beam index other than the one preferred by the device is utilized for initial access and/or for communication between the antenna array and the device. In the same or alternate aspects, if the inquiry provided by the device satisfies one or more of the predetermined connection rules, then the beam index preferred by the device can be utilized for initial access and/or for communication between the antenna array and the device. In such aspects, the systems and methods disclosed herein can allow for a strategic assignment and/or allotment of specific beam indices for one or more specific purposes.

Accordingly, in one aspect, a system for connecting a user device to a wireless telecommunications network is provided. The system can include an antenna array that includes a plurality of antenna elements, where at least part of the plurality of antenna elements utilize a first wireless communication protocol. The system further includes one or more processors configured to execute operations. The operations can include receiving, from a device, an inquiry for connecting to the antenna array. The operations can further include determining if the inquiry satisfies one or more predetermined connection rules. The operations can also include, based at least partly on the determining, utilizing a first beam index for connecting the device to the antenna array for communication between the device and at least one antenna element of the plurality of antenna elements.

In another aspect, a method for connecting a user device to a wireless telecommunications network is provided. The method can include receiving, from a device, an inquiry for connecting to an antenna array via a first beam index. The antenna array can include one or more antenna elements that utilize a first wireless communication protocol. The method can also include modifying the inquiry to form a modified inquiry, where the modified inquiry identifies a second beam index for connecting to the antenna array, and where the second beam index is different than the first beam index. The method can further include utilizing the second beam index for connecting the device to the antenna array for communication between the device and the one or more antenna elements of the antenna array.

In yet another aspect, a method for connecting a user device to a wireless telecommunications network is provided. The method can include receiving, from a device, an inquiry for connecting to an antenna array, the antenna array can include one or more antenna elements that utilize a first wireless communication protocol. The method can further include determining if the inquiry satisfies one or more predetermined connection rules. The method can also include, based at least partly on the determining, utilizing a first beam index for connecting the device to the antenna array for communication between the device and the one or more antenna elements.

As used herein, user equipment (UE) (also referenced herein as a user device or device) can include any device employed by an end-user to communicate with a wireless telecommunications network. A UE can include a mobile device, a mobile broadband adapter, an IoT device, or any other communications device employed to communicate with the wireless telecommunications network. A UE, as one of ordinary skill in the art may appreciate, generally includes one or more antennas coupled to a radio for exchanging (e.g., transmitting and receiving) transmissions with a nearby base station. A UE may be, in an embodiment, similar to device 100 described herein with respect to FIG. 1.

Referring to FIG. 1, a diagram is depicted of an example computing environment suitable for use in implementations of the present disclosure. In particular, the example computing environment is shown and designated generally as computing device 100. Computing device 100 is but one example of a suitable computing environment and is not intended to suggest any limitation as to the scope of use or functionality of the invention. Neither should computing device 100 be interpreted as having any dependency or requirement relating to any one or combination of components illustrated.

The implementations of the present disclosure may be described in the general context of computer code or machine-useable instructions, including computer-executable instructions such as program components, being executed by a computer or other machine, such as a personal data assistant or other handheld device. Generally, program components, including routines, programs, objects, components, data structures, and the like, refer to code that performs particular tasks or implements particular abstract data types. Implementations of the present disclosure may be practiced in a variety of system configurations, including handheld devices, consumer electronics, general-purpose computers, specialty computing devices, etc. Implementations of the present disclosure may also be practiced in distributed computing environments where tasks are performed by remote-processing devices that are linked through a communications network.

With continued reference to FIG. 1, the computing device 100 includes a bus 102 that directly or indirectly couples the following devices: memory 104, one or more processors 106, one or more presentation components 108, input/output (I/O) ports 110, I/O components 112, and a power supply 114. The bus 102 represents what may be one or more busses (such as an address bus, data bus, or combination thereof). Although the devices of FIG. 1 are shown with lines for the sake of clarity, in reality, delineating various components is not so clear, and metaphorically, the lines would more accurately be grey and fuzzy. For example, one may consider a presentation component such as a display device to be one of the I/O components 112. Also, processors, such as one or more processors 106, have memory. The present disclosure recognizes that such is the nature of the art, and reiterates that FIG. 1 is merely illustrative of an example computing environment that can be used in connection with one or more implementations of the present disclosure. Distinction is not made between such categories as "workstation," "server," "laptop," "handheld device," etc., as all are contemplated within the scope of FIG. 1 and refer to "computer" or "computing device."

The computing device 100 typically includes a variety of computer-readable media. Computer-readable media can be any available media that can be accessed by the computing device 100 and includes both volatile and nonvolatile media, removable and non-removable media. By way of example, and not limitation, computer-readable media may comprise computer storage media and communication media. Computer storage media includes both volatile and nonvolatile, removable and non-removable media implemented in any method or technology for storage of information such as computer-readable instructions, data structures, program modules or other data.

Computer storage media includes RAM, ROM, EEPROM, flash memory or other memory technology, CD-ROM, digital versatile disks (DVD) or other optical disk storage, magnetic cassettes, magnetic tape, magnetic disk storage or other magnetic storage devices. Computer storage media does not comprise a propagated data signal.

Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

The memory 104 includes computer-storage media in the form of volatile and/or nonvolatile memory. The memory 104 may be removable, nonremovable, or a combination thereof. Exemplary memory includes solid-state memory, hard drives, optical-disc drives, etc. The computing device 100 includes one or more processors 106 that read data from various entities such as bus 102, the memory 104 or the I/O components 112. One or more presentation components 108 presents data indications to a person or other device. Exemplary one or more presentation components 108 include a display device, speaker, printing component, vibrating component, etc. The I/O ports 110 allow the computing device 100 to be logically coupled to other devices including the I/O components 112, some of which may be built in the computing device 100. Illustrative I/O components 112 include a microphone, joystick, game pad, satellite dish, scanner, printer, wireless device, etc.

The radio 116 represents a radio that facilitates communication with a wireless telecommunications network. Illustrative wireless telecommunications technologies include CDMA, GPRS, TDMA, GSM, and the like. The radio 116 might additionally or alternatively facilitate other types of wireless communications including Wi-Fi, WiMAX, LTE, or other VoIP communications. As can be appreciated, in various embodiments, the radio 116 can be configured to support multiple technologies and/or multiple radios can be utilized to support multiple technologies. A wireless telecommunications network might include an array of devices, which are not shown so as to not obscure more relevant aspects of the invention. Components such as a base station, a communications tower, or even access points (as well as other components) can provide wireless connectivity in some embodiments.

Figure 2:
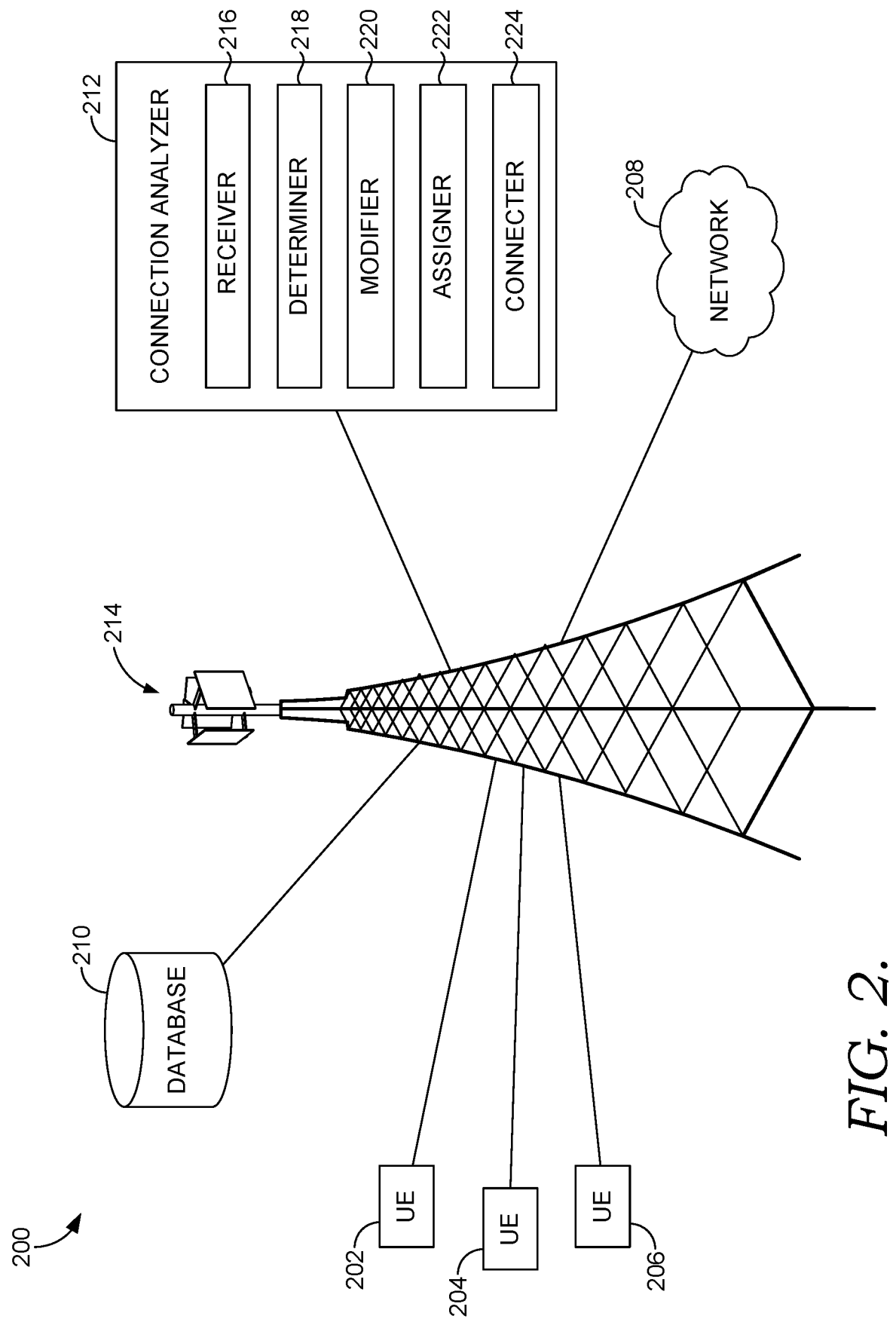
FIG. 2 illustrates a diagram of an exemplary network environment in which implementations of the present disclosure may be employed.

FIG. 2 depicts one example network environment in which implementations of the present disclosure may be employed. Such a network environment is illustrated and designated generally as a network environment 200. The network environment 200 is but one example of a suitable network environment and is not intended to suggest any limitation as to the scope of use or functionality of the invention. Neither should the network environment 200 be interpreted as having any dependency or requirement relating to any one or combination of components illustrated.

The network environment 200 of FIG. 2 includes user devices 202, 204, and 206, a cell site 214, a network 208, a database 210, and a connection analyzer 212. In the network environment 200, the user devices 202, 204, and 206 may take on a variety of forms, such as a personal computer (PC), a user device, a smart phone, a smart watch, a laptop computer, a mobile phone, a mobile device, a tablet computer, a wearable computer, a personal digital assistant (PDA), a server, a CD player, an MP3 player, an IoT device, a video player, a handheld communications device, a workstation, a router, an access point, or any combination thereof, or any other device that communicates via wireless communications with a cell site, e.g., the cell site 214, in order to interact with a public or private network.

In some aspects, the user devices 202, 204, and 206 can correspond to the computing device 100 of FIG. 1. Thus, in aspects, a user device can include, for example, a display(s), a power source(s) (e.g., a battery), a data store(s), a speaker(s), memory, a buffer(s), a radio(s) and the like. In some implementations, a user device, e.g., one or more of the user devices 202, 204, and 206, comprises a wireless or mobile device with which a wireless telecommunication network(s) can be utilized for communication (e.g., voice and/or data communication). In this regard, the user device can be any mobile computing device that communicates by way of a wireless network, for example, a 3G, 4G, 5G, LTE, CDMA, or any other type of network.

In some aspects, the user devices 202, 204, and 206 in the network environment 200 can optionally utilize the network 208 to communicate with other computing devices (e.g., a mobile device(s), a server(s), a personal computer(s), etc.) through the cell site 214 using any one of a plurality of wireless communication protocols, such as 3G, 4G/LTE, 5G and other related protocols. In aspects, the network 208 may be a telecommunications network(s), or a portion thereof. A telecommunications network might include an array of devices or components (e.g., one or more base stations), some of which are not shown. Those devices or components may form network environments similar to what is shown in FIG. 2, and may also perform methods in accordance with the present disclosure. Components such as terminals, links, and nodes (as well as other components) can provide connectivity in various implementations. The network 208 can include multiple networks, as well as being a network of networks, but is shown in more simple form so as to not obscure other aspects of the present disclosure.

The network 208 can be part of a telecommunication network that connects subscribers to their immediate service provider. In some instances, the network 208 can be associated with a telecommunications provider that provides services (e.g., 5G and LTE) to user devices, such as the user devices 202, 204, and 206. For example, the network 208 may provide voice, SMS, and/or data services to user devices or corresponding users that are registered or subscribed to utilize the services provided by a telecommunications provider. The network 208 can comprise any communication network providing voice, SMS, and/or data service(s), such as, for example, a 1× circuit voice, a 3G network (e.g., CDMA, CDMA2000, WCDMA, GSM, UMTS), a 4G network (WiMAX, LTE, HSDPA), or a 5G network.

In some aspects, the cell site 214 can be configured to communicate with user devices, such as the user devices 202, 204, and 206 that are located within the geographical area, or cell, covered by radio antennas of the cell site 214. The cell site 214 may include one or more base stations, base transmitter stations, radios, antennas, antenna arrays, power amplifiers, transmitters/receivers, digital signal processors, control electronics, GPS equipment, and the like. In an aspect, the cell site 214 of the present disclosure may communicate with at least one user device, such as the user device 202 via a wireless communication protocol, such as the 5G wireless communication protocol.

As shown, the cell site 214 is in communication with the connection analyzer 212, which comprises various components that are utilized, in various implementations, to perform one or more methods for connecting a device, e.g., one or more of the user devices 202, 204, or 206, to a wireless telecommunications network, e.g., the network 208. In aspects, the connection analyzer 212 includes a receiver 216, a determiner 218, a modifier 220, an assigner 222, and a connector 224. However, in other implementations, more or less components than those shown in FIG. 2 may be utilized to carry out aspects of the systems and methods described herein. Each of the components or sub components of the connection analyzer 212 may be a stand-alone or combined processor, server, or other computer processing component that is suitably configured to perform the operations described herein.

In various aspects, the receiver 216 of the connection analyzer 212 is generally responsible for receiving information associated with one or more devices, e.g., the user devices 202, 204, and/or 206. In aspects, the information associated with one or more user devices may include one or more inquiries from a device for connecting to an antenna array, e.g., an antenna array associated with the cell site 214. In various aspects, the inquiry may include an identification of one or more preferred beam indices identified by the device for connection to the antenna array, e.g., an antenna array associated with the cell site 214. In the same or alternative aspects, the inquiry may include signal strength values for each of the one or more beam indices. In aspects, the radio frequency (RF) signal strength value can refer to transmitter power output received by an antenna, e.g., associated with the device and/or associated with the antenna array, and can be expressed in any convenient units including, but not limited to, decibels with reference to one milliwatt (dBm). In various aspects, the inquiry can include additional information associated with the device, such as one or more identifiers associated with the device. In aspects, the one or more identifiers can include, but are not limited to, subscription information of the device that may be associated with a network provider, a priority identifier, or both. In certain aspects, the additional information associated with the device may include location information associated with the device.

In aspects, the receiver 216 may receive information from the database 210. In aspects, the database 210 can include any information that is relevant to aid and/or facilitate one or more actions of the connection analyzer 212 for connecting the device to a network, e.g., the network 208. In one aspect, the database 210 can include one or more predetermined connection rules utilized by the connection analyzer 212, and any additional information required for implementing and/or analyzing such rules by the connection analyzer 212 or a component thereof, as described herein. In various aspects, the one or more predetermined connection rules can be any rules or policies that can aid in strategically assigning a beam index to a device for initial access and/or for communication between the device and the network, e.g., the network 208. In various aspects, the one or more predetermined connection rules can include, but are not limited to, requiring that the device be authorized to connect to the network or antenna array associated with a cell site, e.g., the cell site 214, based on: a capacity of the antenna array; a time of day the device is requesting connection to the antenna array; a location of the device; one or more identifiers associated with the device, or a combination thereof. Example scenarios utilizing these example predetermined rules are discussed further below.

In aspects, the determiner 218 can determine if an inquiry, e.g., an inquiry received by the receiver 216, satisfies one or more predetermined connection rules. In various aspects, the determiner 218 can determine if an inquiry, which indicates a device-preferred beam index for use in gaining initial access to the network and/or for communication between the device and the network, satisfies one or more predetermined connection rules.

In one example aspect, the determiner 218 can determine, given the current capacity load of an antenna array associated with the cell site, if the device-preferred beam index is available for use by the device in gaining initial access and/or for communication between the device and the network. For instance, the device may be authorized to utilize the device-preferred beam index for initial access and/or for communication between the device and the network when the current capacity load is below a specific threshold value. In an instance when the current capacity load of the antenna array is above a specific threshold value the device may not be authorized to utilize the device-preferred beam index for initial access and/or for communication between the device and the network.

In another example aspect, the determiner 218 can determine, given the time of day, if the device-preferred beam index is available for use by the device in gaining initial access and/or for communication between the device and the network. For instance, in one aspect, the device may be authorized to utilize the device-preferred beam index for initial access and/or for communication between the device and the network only during a specific time frame. For example, one or more predetermined rules may require that only certain devices can utilize a specific beam index, e.g., the device-preferred beam index in this example, during specific time periods, such as during or after business hours, and/or during specific time periods of predicted or actual increased usage.

In another example aspect, the determiner 218 can determine if the device-preferred beam index is available for use by the device in gaining initial access and/or for communication between the device and the network depending upon the location of the device. For instance, in one aspect, the device may be authorized to utilize the device-preferred beam index for initial access and/or for communication between the device and the network when the device is within a specific location, such as at a particular establishment.

In yet another example aspect, the determiner 218 can determine if the device-preferred beam index is available for use by the device in gaining initial access and/or for communication between the device and the network depending upon information associated with the device. For instance, in such aspects, the determiner 218 can determine if the device-preferred beam index is available for use by the device in gaining initial access and/or for communication between the device and the network based one or more identifiers associated with the device. For instance, a device may be registered with, or otherwise known to, via subscription information, a network provider as being associated with emergency services or another type of priority user, and in such an instance, any device-preferred beam index may be utilized by the device for initial access and/or for connection with a network. In the same or alternative aspects, the one or more identifiers can include a priority identifier, which may be utilized to identify a priority user device that may, in one aspect, be authorized to utilize any device-preferred beam index for initial access and/or for connection with a network.

In one or more aspects, the one or more predetermined rules may be designed so that any predetermined rule may supersede or negate another rule. For instance, a device having one or more identifiers, e.g., a priority identifier, may be authorized to utilize a device-preferred beam index for initial access and/or for connection with a network even if another predetermined rule, e.g., a location-based rule and/or capacity load-based rule, would result in the opposite determination.

In various aspects, the modifier 220 can be generally responsible for modifying an inquiry received by the receiver 216 and/or provided by a device. In aspects, the modifier 220 can modify an inquiry based on a determination made by the determiner 218. In certain aspects, the modifier 220 can modify an inquiry based on a determination, e.g., via the determiner 218, that the inquiry does not satisfy one or more predetermined connection rules. In such aspects, the modifier 220 can modify an inquiry from a device, when the determiner 218 has determined that the device associated with the inquiry is not authorized to utilized the device-preferred beam index, e.g., based on one or more predetermined connection rules. In various aspects, the modifier 220 can modify the inquiry forming a modified inquiry that was modified to specify a different beam index, e.g., different than the device-preferred beam index, for initial access and/or for connection with a network.

In another aspect, the modifier 220 can modify an inquiry by providing an indication to the inquiry that indicates that the inquiry satisfies one or more predetermined connection rules, which may indicate that the device is authorized to utilize the device-preferred beam index for initial access and/or for connection with a network.

In various aspects, the assigner 222 is generally responsible for assigning a beam index for a device to gain initial access and/or to connect or communication with a network. In aspects, the assigner 222 can assign the device-preferred beam index for the device, or a beam index that was provided by the modifier 220 in a modified inquiry, depending upon one or more determinations made by the determiner 218. In aspects, the assigner 222 can assign a beam index for a device by, for example, communicating the approved beam index to one or more components of the network environment 200, e.g., an enodeB and/or a gnodeB, or a processor associated therewith.

In aspects, the connecter 224 is generally responsible for facilitating for the device initial access and/or facilitating communication between the device and the network. In various aspects, the connecter 224 can facilitate initial access and/or facilitate communication between the device and the network using any convenient components of the network environment, such as an enodeB and/or a gnodeB, or a processor associated therewith. In aspects, the connector 224 utilizes the beam index assigned by the assigner 222 for facilitating for the device initial access and/or for facilitating communication between the device and the network.

Figure 3:
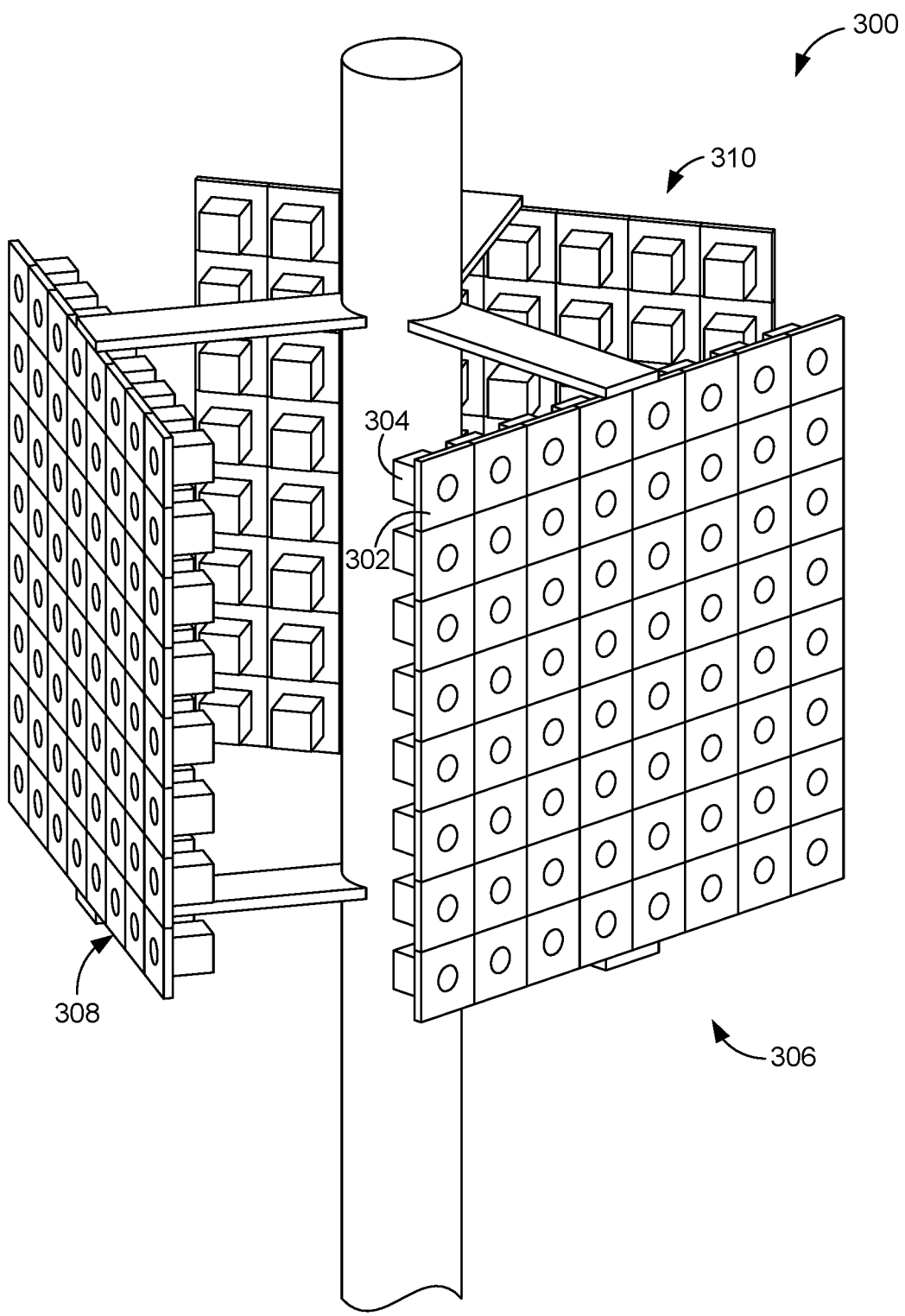
FIG. 3 depicts a schematic representation of a base station suitable for use in aspects of the present disclosure.

FIG. 3 depicts an example base station configuration suitable for use in implementing embodiments of the present disclosure and is designated generally as base station 300. Base station 300 is but one example of a suitable configuration and is not intended to suggest any limitations as to the scope of use or functionality of embodiments described herein. Neither should the configuration be interpreted as having any dependency or requirement relating to any one or combination of components illustrated.

In the aspect depicted in FIG. 3, the base station 300 includes a first antenna array 306, a second antenna array 308, and a third antenna array 310. As can be seen in the aspect depicted in FIG. 3, the first antenna array 306 includes one or more antenna elements 302. In aspects, the one or more antennas 302 may be dipole antennas, having a length, for example, of ¼, ½, 1, or 1½ wavelength. In aspects, the antenna array 306 may be an active antenna array, FD-MIMO, massive MIMO, 3G, 4G, 5G, and/or 802.11. While we refer to dipole antennas herein, in other aspects, the antenna may be monopole, loop, parabolic, traveling-wave, aperture, yagi-uda, conical spiral, helical, conical, radomes, horn, and/or apertures, or any combination thereof. It is noted that adjusting one or more individual power supplies to antennas of an antenna array may be broadly applicable to an antenna array comprising any type of antenna targeting any portion of the RF spectrum (though any lower than VHF may be size prohibitive). In one aspect, the antenna may be configured to communicate in the UHF and/or SHF spectrum, for example, in the range of 1.3 GHz 30 GHz.

By way of a non-limiting example, the antenna array 306 may comprise 64 antenna elements 302 arranged in an 8×8 structure. In other aspects, the antenna array 306 may comprise antenna elements arranged in an 8×4, 4×8, or 4×4 configuration. Each antenna element 302 of the antenna array 306 comprises a dedicated power supply 304. The power supply 304 supplies power having a certain phase and amplitude to a respective antenna element 302. In an aspect, the power supply comprises a power amplifier. In an aspect not depicted in the figures, the base station 300 may further comprise a processor.

In certain aspects, the antenna array 306 may communicate or is capable of communicating with devices, using a 5G wireless communication protocol. While in this example, 5G is mentioned as a wireless communication protocol, it should be understood that any wireless communication protocol standard may be utilized for example, 3G, 4G, LTE, 5G, 802.11, or any other operator-elected wireless communication protocol standard. In the aspect depicted in FIG. 3, the antenna array 306 can include 64 antenna elements each with a distinct direction which may be known, and where each antenna element is capable of communicating with one or more devices, e.g., using one or more specific beams, each identifiable as a beam index, as referred to herein, in aspects. In the same or alternative aspects, a device may communicate with more than one antenna element of the antenna array 306. In aspects, using the methods and systems disclosed herein with a high-density antenna array, such as the antenna array 306, and using a 5G wireless communication protocol as an example, can facilitate the strategic assignment of beam indices and/or allotment of beam indices tailored for a specific purpose or environment.

Figure 4:
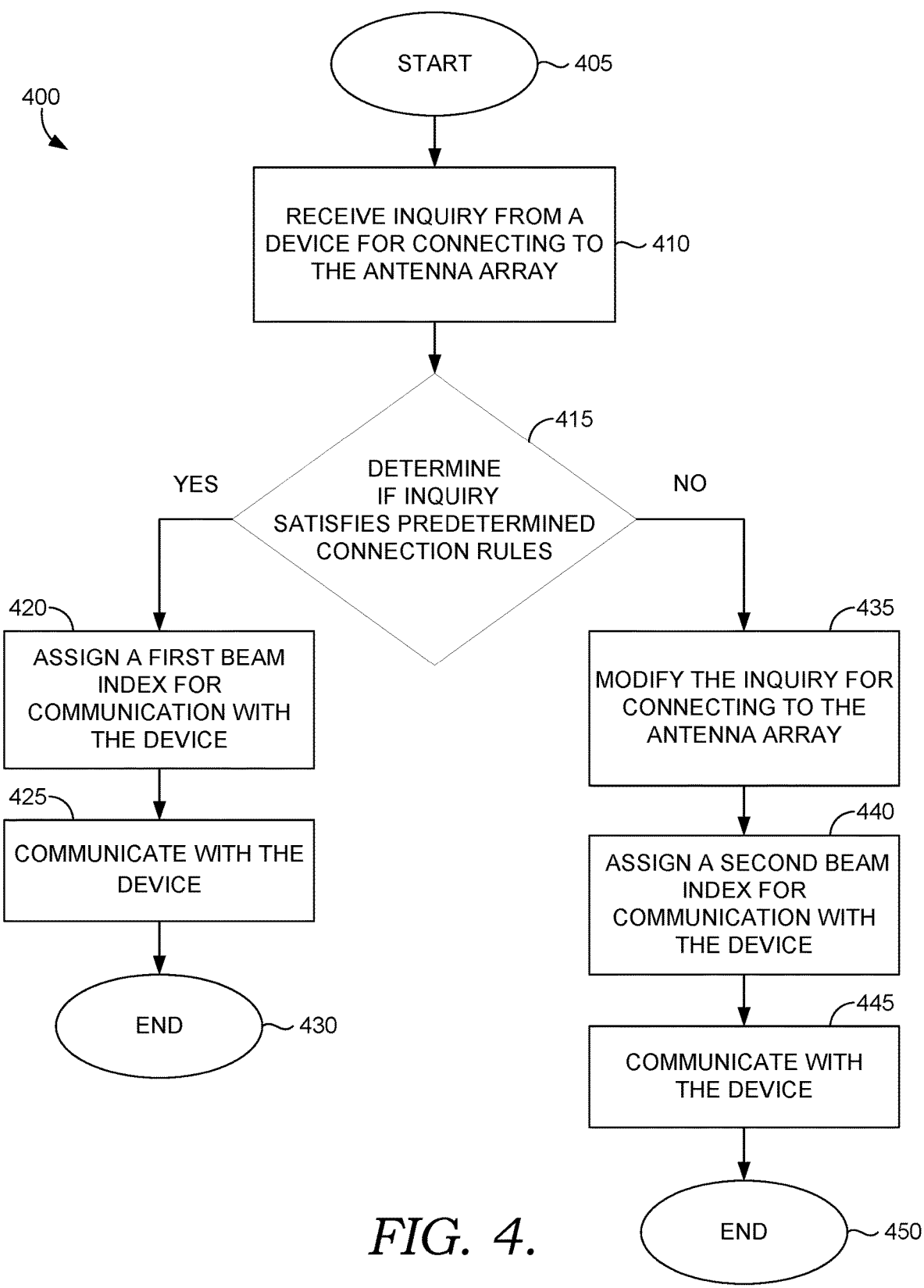
FIG. 4 depicts a flow diagram of an exemplary method for connecting a device to a wireless telecommunications network, in accordance with aspects of the present disclosure.

FIG. 4 depicts a flow diagram of an example method 400 for connecting a user device to a telecommunications network. The method 400 begins at the step 405, where a device may have entered an area covered by one or more antenna elements of an antenna array, e.g., the antenna array 306 of the base station 300 of FIG. 3. In such aspects, the device may detect and/or measure one or more signals, e.g., synchronizations signals, from the antenna array.

The step 410 of the method 400, includes receiving, from the device, an inquiry for connecting to the antenna array. In aspects, the receiver 216 of the connection analyzer 212 of FIG. 2 can perform at least a portion of the step 410. In some aspects, as discussed above with reference to the connection analyzer 212 of FIG. 2, the inquiry may include an identification of one or more preferred beam indices identified by the device for connection to the antenna array, e.g., the antenna array 306 of the base station 300 of FIG. 3. In various aspects, the inquiry may optionally also include signal strength values for each of the one or more identified beam indices. Further, as discussed above, the inquiry can include additional information associated with the device, such as one or more identifiers associated with the device.

In the step 415 of the method 400, a determination of whether or not the inquiry satisfies one or more predetermined connection rules is made. In aspects, the determination of the step 415 can be performed at least partly by the determiner 218 of the connection analyzer 212 of FIG. 2. In aspects, as discussed above, the determination can include analyzing whether or not an inquiry, which may identify a device-preferred beam index for use in gaining initial access to the network at the cell site and/or for communication between the device and the network, satisfies one or more predetermined connection rules. Further, as discussed above, the one or more predetermined connection rules can include any rule or policy for strategically assigning and allocating beam indices of one or more antenna arrays for one or more specific scenarios and/or environments. Example predetermined connection rules can include, but are not limited to, requiring that the device be authorized to connect to the network or antenna array associated with a cell site based on: a capacity of the antenna array; a time of day the device is requesting connection to the antenna array; a location of the device; one or more identifiers associated with the device, or a combination thereof.

In aspects, when, at the step 415, it is determined that the inquiry from the device satisfies one or more predetermined connection rules, the method proceeds to step 420 where a first beam index is assigned for initial access and/or communication between the device and an antenna array. In such aspects, the first beam index can be assigned to the device for initial access and/or communication between the device and the network or associated antenna array via the assigner 222 of the connection analyzer 212 of FIG. 2. In various aspects, the first beam index may be identified in the inquiry as a device-preferred beam index for initial access and/or communication with the network.

At the step 425, the device is connected to the antenna array and/or the network via the first beam index assigned in the step 420. In aspects, the connecter 224 of the connection analyzer 212 of FIG. 2 can connect the device to the antenna array and/or the network for communication. In aspects, the first beam index can be associated with uplink and/or downlink communications between the device and the antenna array and/or the network.

At the step 430, the method ends when the communication between the device and the network or associated antenna via the first beam index is terminated. In aspects, the device may attempt to reconnect with the antenna array and/or the network and may start again at the step 405.

In aspects, when, at the step 415, it is determined that the inquiry from the device does not satisfy one or more predetermined connection rules, the method proceeds to step 435 where the inquiry from the device is modified to identify a second beam index for initial access and/or communication between the device and an antenna array. In aspects, as discussed above, the modifier 220 of the connection analyzer 212 of FIG. 2 can modify the initial inquiry from the device in response to a determination that the initial inquiry does not satisfy one or more predetermined connection rules. In certain aspects, the second beam index was not present in the initial inquiry from the device as an identified beam index for initial access and/or communication between the device and the network or an associated antenna array.

At the step 440, the second beam index is assigned for initial access and/or communication between the device and an antenna array. In such aspects, the second beam index can be assigned to the device for initial access and/or communication between the device and the network or associated antenna array via the assigner 222 of the connection analyzer 212 of FIG. 2.

At the step 445, the device is connected to the antenna array and/or the network via the second beam index assigned in the step 440. In aspects, the connecter 224 of the connection analyzer 212 of FIG. 2 can connect the device to the antenna array and/or the network for communication. In aspects, the second beam index can be associated with uplink and/or downlink communications between the device and the antenna array and/or the network.

At the step 450, the method ends when the communication between the device and the network or associated antenna via the second beam index is terminated. In aspects, the device may reconnect with the antenna array and/or the network and may start again at the step 405.

Figure 5:
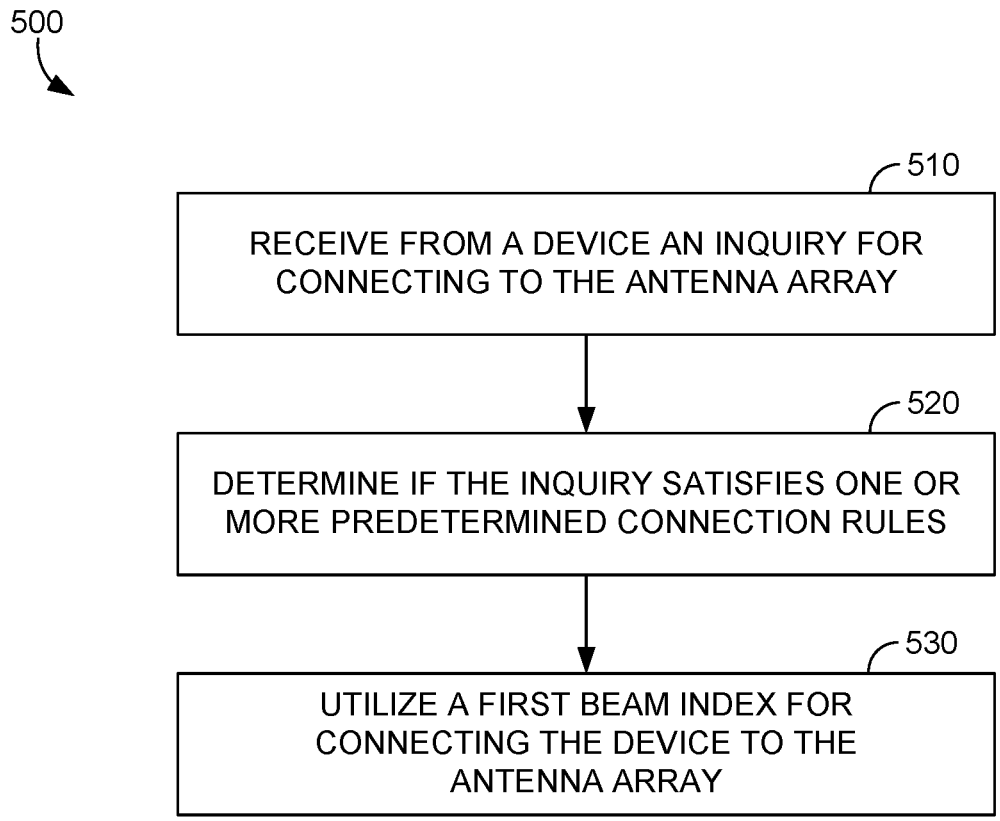
FIG. 5 depicts a flow diagram of another exemplary method for connecting a device to a wireless telecommunications network, in accordance with aspects of the present disclosure.

FIG. 5 is a flow chart of a method 500 for connecting a user device to a wireless telecommunications network. The step 510 of the method 500, includes receiving, from a device, an inquiry for connecting to an antenna array. In aspects, the step 510 can be performed at least partly by the receiver 216 of the connection analyzer 212 of FIG. 2. As discussed above, in an aspect, the inquiry may include an identification of one or more preferred beam indices identified by the device for connection to the antenna array, e.g., the antenna array 306 of the base station 300 of FIG. 3. In various aspects, the inquiry may optionally also include signal strength values for each of the one or more beam indices. Further, as discussed above, the inquiry can include additional information associated with the device, such as one or more identifiers associated with the device.

The step 520 of the method 500 includes determining if the inquiry satisfies one or more predetermined connection rules. In various aspects, the step 520 can be at least partly performed by the determiner 218 of the connection analyzer 212 of FIG. 2. In certain aspects, as discussed above, the determination can include analyzing whether or not the inquiry satisfies one or more predetermined connection rules. For instance, in aspects, it is determined if an inquiry, which includes an identification of a device-preferred beam index for initial access and/or for communications between the device and the network, satisfies one or more predetermined connection rules. In aspects as discussed above, a non-limiting list of example predetermined connection rules includes requiring that the device be authorized to connect to the network or antenna array associated with a cell site based on: a capacity of the antenna array; a time of day the device is requesting connection to the antenna array; a location of the device; one or more identifiers associated with the device, or a combination thereof.

The step 530 of the method 500 includes utilizing a first beam index for connecting the device to the antenna array, e.g., for communication between the device and at least one antenna element of an antenna array. In aspects, the step 530 can be performed based at least partly on the determining of the step 520. For instance, in aspects, in the step 520, it may have been determined that the initial inquiry from the device satisfies one or more predetermined connection rules and the first beam index was assigned for communication between the device and at least one antenna element of an antenna array. In such an example aspect, the first beam index may have been a device-preferred beam index, e.g., as identified in the initial inquiry. Alternatively, in another aspect, in the step 520 it may have been determined that the initial inquiry from the device did not satisfy one or more predetermined connection rules, and the first beam index was assigned for communication between the device and at least one antenna element of an antenna array. In such an alternative example aspect, the first beam index may not have been a device-preferred beam index, e.g., may not have been identified in the inquiry.

Figure 6:
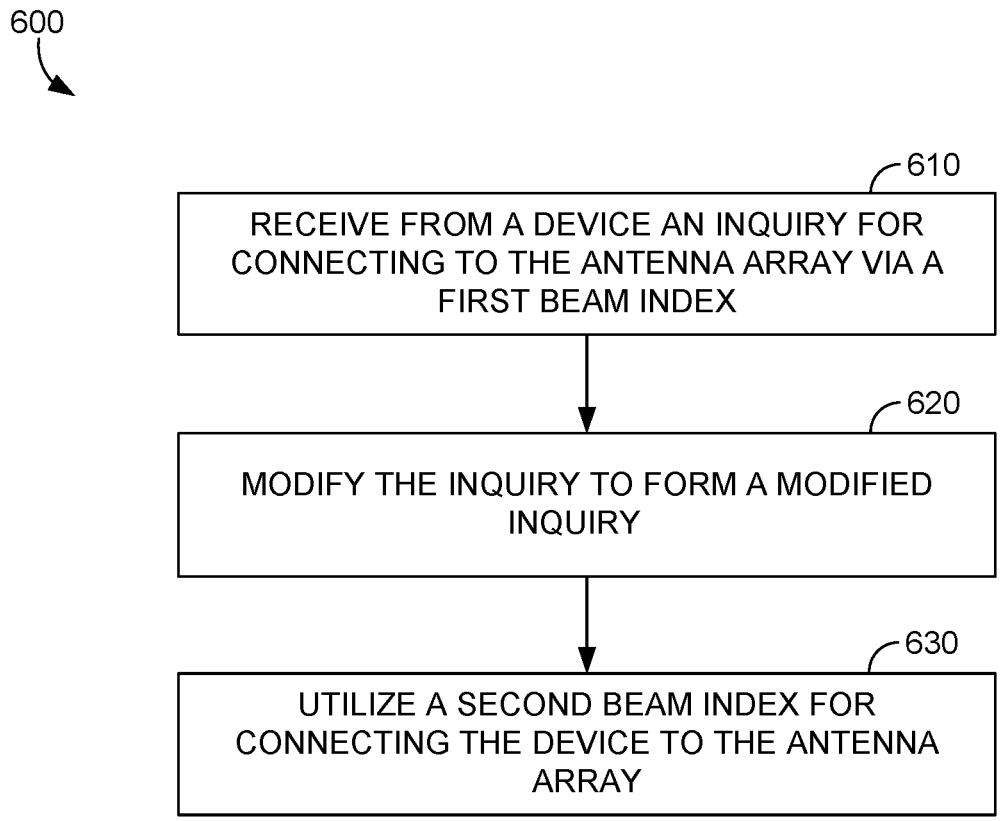
FIG. 6 depicts a flow diagram of yet another exemplary method for connecting a device to a wireless telecommunications network, in accordance with aspects of the present disclosure.

FIG. 6 is a flow chart of a method 600 for connecting a user device to a wireless telecommunications network. The step 610 of the method 600, includes receiving, from a device, an inquiry for connecting to an antenna array. In aspects, the step 610 can be performed at least partly by the receiver 216 of the connection analyzer 212 of FIG. 2. In aspects, the inquiry can include an indication that the device prefers to connect to the antenna array via a first beam index. In various aspects, the inquiry may optionally also include signal strength values for beam indices identified in the inquiry. Further, as discussed above, the inquiry can include additional information associated with the device, such as one or more identifiers associated with the device.

The step 620 of the method 600 includes modifying the inquiry to form a modified inquiry. In aspects, the step 620 can be performed at least partly by the modifier 220 of the connection analyzer 212 of FIG. 2. In aspects, as discussed above, an initial inquiry from a device can be modified so that the modified inquiry satisfies one or more predetermined rules. In such an aspect, the modified inquiry can identify a different beam index other than the first beam index, e.g., a second beam index, for communication between the device and at least one antenna element of an antenna array. In such aspects, the second beam index may not have been present or identified in the initial inquiry provided by the device, e.g., may not have been the device-preferred beam index.

The step 630 of the method 600 includes utilizing the second beam index for connecting the device to the antenna array, e.g., for communication between the device and at least one antenna element of an antenna array. The step 630 can be performed at least partly by the connecter 224 of the connection analyzer 212 of FIG. 2. In aspects, prior to the step 630, the second beam index may have been assigned for communication between the device and at least one antenna element of an antenna array. In such aspects, the assigner 222 of the connection analyzer 212 of FIG. 2 can at least partly perform such an assignment.

Many different arrangements of the various components depicted, as well as components not shown, are possible without departing from the scope of the claims below. Embodiments of our technology have been described with the intent to be illustrative rather than restrictive. Alternative embodiments will become apparent to readers of this disclosure after and because of reading it. Alternative means of implementing the aforementioned can be completed without departing from the scope of the claims below. Certain features and subcombinations are of utility and may be employed without reference to other features and subcombinations and are contemplated within the scope of the claims.

The invention claimed is:

1. A system for connecting a user device to a wireless telecommunications network, the system comprising:
   an antenna array comprising a plurality of antenna elements, wherein at least part of the plurality of antenna elements utilize a first wireless communication protocol; and
   one or more processors configured to execute operations comprising:
   receiving, from a device, an inquiry for connecting to the antenna array;
   determining if the inquiry satisfies one or more predetermined connection rules, at least partly based on determining if the device is authorized to connect to the antenna array based on: a capacity of the antenna array; a time of day the device is requesting connection to the antenna array; a location of the device; or a combination thereof; and
   based at least partly on the determining, utilizing a first beam index for connecting the device to the antenna array for communication between the device and at least one antenna element of the plurality of antenna elements.

2. The system according to claim 1, wherein the first wireless communication protocol is a 5G wireless communication protocol.

3. The system according to claim 1, wherein the inquiry comprises a measurement report, the measurement report comprising an identification of one or more beam indices identified by the device for connecting to the antenna array.

4. The system according to claim 3, wherein the measurement report further comprises signal strength values for each of the one or more beam indices and an indication of a preferred beam index of the one or more beam indices for connecting with the antenna array.

5. The system according to claim 4, wherein the preferred beam index of the one or more beam indices for connecting with the antenna array is the first beam index.

6. The system according to claim 3, wherein the one or more beam indices identified by the device for connecting to the antenna array does not include the first beam index.

7. The system according to claim 1, wherein the one or more processors are configured to execute operations further comprising:
based on the determining, modifying the inquiry to include an identification of the first beam index for connecting to the antenna array.

8. The system according to claim 1, wherein the inquiry includes one or more identifiers associated with the device, the one or more identifiers comprising subscription information, a priority identifier, or both.

9. A method for connecting a user device to a wireless telecommunications network, the method comprising:
receiving, from a device, an inquiry for connecting to an antenna array via a first beam index, the antenna array comprising one or more antenna elements that utilize a first wireless communication protocol;
modifying the inquiry to form a modified inquiry, wherein the modified inquiry identifies a second beam index for connecting to the antenna array, and wherein the second beam index is different than the first beam index; and
utilizing the second beam index for connecting the device to the antenna array for communication between the device and the one or more antenna elements of the antenna array.

10. The method according to claim 9, wherein the first wireless communication protocol is a 5G wireless communication protocol.

11. The method according to claim 9, further comprising:
prior to the modifying, determining that the device is not authorized to connect to the antenna array using the first beam index based on one or more: of a capacity of the antenna array; a time of day the device is requesting connection to the antenna array; a location of the device; one or more identifiers associated with the device; or a combination thereof.

12. The method according to claim 11, wherein the inquiry comprises a measurement report, the measurement report comprising an identification of one or more beam indices identified by the device for connection to the antenna array and associated signal strength values for each of the one or more beam indices, wherein the one or more beam indices includes the first beam index as a preferred beam index.

13. The method according to claim 12, wherein the one or more beam indices does not include the second beam index.

14. The method according to claim 11, wherein the determining comprises determining that the device is not authorized to connect to the antenna array using the first beam index based at least partly on one or more identifiers associated with the device and provided in the inquiry.

15. The method according to claim 14, wherein the one or more identifiers do not include a priority identifier.

16. A method for connecting a user device to a wireless telecommunications network, the method comprising:
receiving, from a device, an inquiry for connecting to an antenna array, the antenna array comprising one or more antenna elements that utilize a first wireless communication protocol;
determining if the inquiry satisfies one or more predetermined connection rules, at least partly based on determining if the device is authorized to connect to the antenna array based on: a capacity of the antenna array; a time of day the device is requesting connection to the antenna array; a location of the device; or a combination thereof; and
based at least partly on the determining, utilizing a first beam index for connecting the device to the antenna array for communication between the device and the one or more antenna elements.

17. The method according to claim 16, wherein the inquiry comprises a measurement report, the measurement report comprising an identification of one or more beam indices identified by the device for connection to the antenna array, wherein the one or more beam indices does not include the first beam index as a preferred beam index.

18. The system according to claim 16, wherein the inquiry comprises a measurement report, the measurement report comprising an identification of one or more beam indices identified by the device for connection to the antenna array, wherein the listing of beam indices includes the first beam index as a preferred beam index.

* * * * *